(12) United States Patent
Anzinger et al.

(10) Patent No.: US 7,793,867 B2
(45) Date of Patent: Sep. 14, 2010

(54) METHOD FOR PRODUCING AN INJECTOR BODY AND CORRESPONDING INJECTOR BODY

(75) Inventors: Claus Anzinger, Neutraubling (DE); Willibald Schürz, Pielenhofen (DE); Martin Simmet, Bad Abbach (DE)

(73) Assignee: Continental Automotive GmbH, Hannover (DE)

( * ) Notice: Subject to any disclaimer, the term of this patent is extended or adjusted under 35 U.S.C. 154(b) by 473 days.

(21) Appl. No.: 11/815,548

(22) PCT Filed: Feb. 7, 2006

(86) PCT No.: PCT/EP2006/050721
§ 371 (c)(1),
(2), (4) Date: Aug. 3, 2007

(87) PCT Pub. No.: WO2006/084843
PCT Pub. Date: Aug. 17, 2006

(65) Prior Publication Data
US 2008/0134488 A1    Jun. 12, 2008

(30) Foreign Application Priority Data
Feb. 8, 2005    (DE) .................. 10 2005 005 690

(51) Int. Cl.
*F02M 61/10* (2006.01)
*F02M 61/12* (2006.01)
*F02M 61/04* (2006.01)
*F02M 61/00* (2006.01)
*F02M 61/16* (2006.01)
*F02M 63/00* (2006.01)
*B05B 1/00* (2006.01)
*B23K 1/19* (2006.01)
*B23K 20/22* (2006.01)

(52) U.S. Cl. ............... 239/533.2; 239/600; 228/262.42; 228/262.9

(58) Field of Classification Search ............ 239/5, 239/88–96, 533.2–533.12, 585.1–585.5; 228/262.1, 262.31, 262.41, 262.42, 262.51, 228/262.71, 262.8, 262.9; 29/428, 890.12, 29/890.124, 890.142
See application file for complete search history.

(56) References Cited

U.S. PATENT DOCUMENTS
3,378,904 A    4/1968  Prasse et al. .............. 29/156.7
(Continued)

FOREIGN PATENT DOCUMENTS
CN    1119524    4/1996
(Continued)

OTHER PUBLICATIONS
International Search Report PCT/EP2006/050721, 6 pages, Apr. 28, 2006.
(Continued)

*Primary Examiner*—Darren W Gorman
(74) *Attorney, Agent, or Firm*—King & Spalding L.L.P.

(57) ABSTRACT

A nozzle body has a first nozzle body element (1) and a second nozzle body element (3). The first nozzle body element (1) is provided with a first nozzle-needle recess (10) accommodating an nozzle-needle (15) and a first guide area (8) for the nozzle-needle (15). In a first process step, the first nozzle body element (1) is assembled with the second nozzle body element (3). Brazing solder having a working temperature in the range of the tempering temperature of the first nozzle body element (1) is supplied to an assembly area (5). The assembly area (5) is defined between the second nozzle body element (3) and the first nozzle body element (1). The assembled first nozzle body element (1) and second nozzle body element (3) is subjected to tempering during which the tempering temperature of the first nozzle body element (1) is reached.

14 Claims, 3 Drawing Sheets

U.S. PATENT DOCUMENTS

| | | | |
|---|---|---|---|
| 6,009,616 A | 1/2000 | Gellert | 29/611 |
| 6,074,500 A | 6/2000 | Schebitz et al. | 148/528 |
| 6,300,523 B1 | 10/2001 | Ikushima et al. | 568/383 |
| 6,378,792 B2 | 4/2002 | Fukaya et al. | 239/533.12 |
| 6,441,335 B1 | 8/2002 | Nagaoka | 219/121.14 |
| 6,959,878 B1 * | 11/2005 | O'Brien et al. | 239/5 |
| 2002/0056768 A1 * | 5/2002 | Czimmek | 239/585.1 |
| 2004/0099754 A1 | 5/2004 | Dantes et al. | 239/585.4 |
| 2005/0006898 A1 | 1/2005 | Hardt et al. | 285/328 |
| 2005/0098660 A1 | 5/2005 | Ganser et al. | 239/533.2 |

FOREIGN PATENT DOCUMENTS

| | | |
|---|---|---|
| DE | 1213457 | 3/1966 |
| DE | 19733135 A1 | 2/1999 |
| DE | 19915874 A1 | 10/1999 |
| DE | 19855557 C1 | 4/2000 |
| DE | 10202722 A1 | 11/2003 |
| DE | 69906769 T2 | 11/2003 |
| DE | 10355028 A1 | 6/2005 |
| EP | 0982493 | 7/1999 |
| EP | 1028252 A2 | 2/2000 |
| EP | 1413749 A2 | 10/2003 |
| JP | 6249105 | 9/1994 |
| JP | 2000136161 | 5/2000 |
| JP | 2004-521233 | 7/2004 |
| JP | 2004-521257 | 7/2004 |

OTHER PUBLICATIONS

Written Opinion of International Search Report PCT/EP2006/050721, 1 page.

* cited by examiner

METHOD FOR PRODUCING AN INJECTOR BODY AND CORRESPONDING INJECTOR BODY

CROSS-REFERENCE TO RELATED APPLICATIONS

This application is a U.S. national stage application of International Application No. PCT/EP2006/050721 filed Feb. 7, 2006, which designates the United States of America, and claims priority to German application number 10 2005 005 690.3 filed Feb. 8, 2005, the contents of which are hereby incorporated by reference in their entirety.

TECHNICAL FIELD

The invention relates to a method of manufacturing a nozzle body. The invention moreover relates to a nozzle body that may be manufactured by such a method.

BACKGROUND

Nozzle bodies that are fitted for example into injectors for internal combustion engines are generally manufactured in one piece. In this case, high demands are placed on the material of such nozzle bodies. Nozzle bodies for use in petrol high-pressure injectors, owing to the properties of the fuel, have to be manufactured from high-grade steel in order to provide corrosion resistance. In addition to corrosion resistance with regard to moisture in the fuel, the material used should be extremely hard in some regions and eminently weldable in other regions of the nozzle body.

SUMMARY

A cost-effective manufacture of the nozzle body can be provided by a method of manufacturing a nozzle body, which comprises a first nozzle-body part and a second nozzle-body part, wherein in the first nozzle-body part a first nozzle-needle recess for receiving a nozzle needle and a first guide region for the nozzle needle are formed, the method comprising the steps of assembling the first nozzle-body part with the second nozzle-body part, wherein an assembly region is developed between the second nozzle-body part and the first nozzle-body part, feeding brazing solder having a working temperature in the region of the hardening temperature of the first nozzle-body part to the assembly region, and subjecting the assembled first nozzle-body part and second nozzle-body part to a hardening operation, during which the hardening temperature of the first nozzle-body part is reached.

According to another embodiment, a nozzle body may comprise a first nozzle-body part and a second nozzle-body part, wherein in the first nozzle-body part a first nozzle needle recess for receiving a nozzle needle and a first guide region for the nozzle needle are formed, an assembly region, which is formed between the second nozzle-body part and the first nozzle-body part, and a brazing solder connection, which is formed in the assembly region and the working temperature of which lies in the region of the hardening temperature of the first nozzle-body part.

BRIEF DESCRIPTION OF THE DRAWINGS

Exemplary embodiments of the invention are described below with reference to the diagrammatic drawings. The drawings show.

In all of the figures, elements of an identical design or function are denoted by the same reference characters.

DETAILED DESCRIPTION

Figure 1:
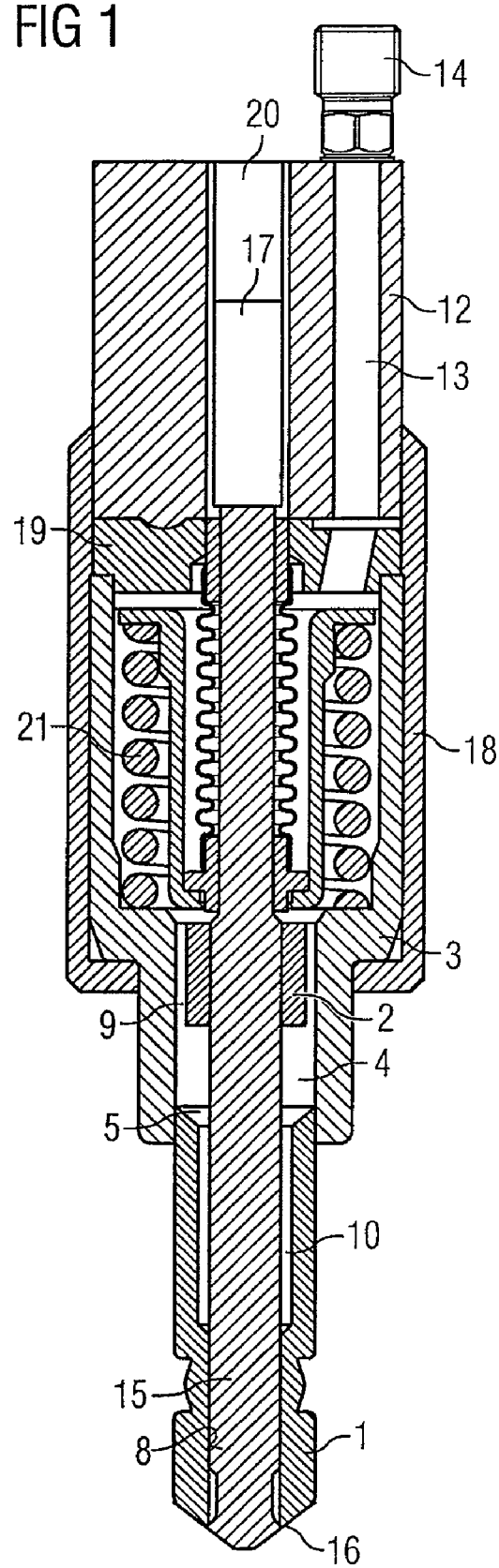
FIG. 1 a section through an injector having a two-part nozzle body,
FIG. 2 a section through a two-part nozzle body with a needle guide body,
FIG. 3 a section through the assembly region
FIG. 4 a sequence chart.

According to a first embodiment of a method of manufacturing a nozzle body, which comprises a first nozzle-body part and a second nozzle-body part, in the first nozzle-body part, a first nozzle-needle recess for receiving a nozzle needle and a first guide region for the nozzle needle are formed. In a first step the first nozzle-body part is assembled with the second nozzle-body part, wherein an assembly region develops between the second nozzle-body part and the first nozzle-body part. The assembly region is a region, in which the first nozzle-body part 1 and the second nozzle-body part 3 in the assembled state have directly opposing faces, which need not necessarily be in mutual contact. This may be effected for example in that the first nozzle-body part and the second nozzle-body part take the form of rotational solids, wherein the first nozzle-body part has a smaller diameter than the second nozzle-body part. Consequently, the first nozzle-body part is inserted into the second nozzle-body part. The assembly region further develops for example between the first nozzle-body part and the second nozzle-body part if both take the form of rotational solids of identical diameter and are disposed axially relative to one another. After assembly of the first nozzle-body part with the second nozzle-body part, in a further step brazing solder is fed to the assembly region. The brazing solder is selected such that its working temperature lies in the region of the hardening temperature of the first nozzle body.

In a further step, the assembled first nozzle-body part and second nozzle-body part are subjected to a hardening operation. During hardening, the hardening temperature of the first nozzle-body part is reached.

The method, by virtue of the advantageous splitting of the nozzle body into at least two individual parts, allows a cost reduction. The first nozzle-body part may be manufactured from a different material to the second nozzle-body part. Thus, instead of an expensive hardenable high-grade steel, it is also possible to use a comparatively cheaper high-grade steel for the second nozzle-body part. The material outlay and the cost of the expensive material are therefore markedly reduced. What is more, owing to the at least two-part construction of the nozzle body the degree of machining is reduced. The two-part construction allows the use of the appropriate raw material for the respective types, with the result that markedly less scrap material is produced during stock removal.

A clear cost benefit is achieved with regard to material outlay and degree of machining.

The method has the further advantage that during one method step the first and second nozzle-body parts are connected to one another by a brazing solder connection and at least the first nozzle-body part is hardened. The first nozzle-body part and the second nozzle-body part undergo a hardening operation, during which the hardening temperature of the first nozzle-body part is reached. The reaching of the hardening temperature during the hardening operation means that at least the first nozzle-body part is hardened. Furthermore, the brazing solder during the hardening operation reaches its working temperature, melts and flows as a result of capillary action into the assembly region. A brazing solder connection therefore develops between the first nozzle-body part and the second nozzle-body part. The tuning of the working temperature of the brazing solder to the hardening temperature of the first nozzle-body part makes it possible to achieve a connection of the nozzle-body parts by means of a brazing solder connection.

In an embodiment of the method, the second nozzle-body part is manufactured from an eminently weldable high-grade steel and the first nozzle-body part is manufactured from an eminently hardenable high-grade steel. The eminent weldability of the second nozzle-body part is advantageous if the nozzle body is fitted for example into an injector for internal combustion engines in a fuel-proof manner by means of a welded joint. The eminent hardenability of the first nozzle-body part is advantageous in order, for example, to reduce the wear of the first nozzle-needle recess. The use of different materials has the advantage that a purposeful influence may be brought to bear upon the material properties in different regions of the nozzle body and one is not restricted to a single material for the nozzle body.

In a further embodiment of the method, the assembly region is designed at one end with an interference fit and at the other end with a gap. This has the advantage that, firstly, the first nozzle-body part is connected by an interference fit to the second nozzle-body part. By means of the interference fit the first and second nozzle-body parts are mechanically coupled to one another and occupy a fixed position relative to one another. The position of the two nozzle-body parts may be varied only by a concerted action of force.

The formation of a gap in the assembly region makes it possible to achieve a better brazing solder connection. The brazing solder flows as a result of capillary action into the gap and develops in the gap. Thus, by virtue of a structural design measure it is possible to define a region, in which the brazing solder connection is to develop. As a result, a better brazing solder connection is achieved.

In a further embodiment of the method, a nozzle-needle guide body is introduced prior to the hardening operation into the second nozzle-body part. Consequently, the nozzle-needle guide body simultaneously undergoes the hardening operation. This has the advantage that the nozzle-needle guide body, given a suitable choice of material, is simultaneously hardened by the hardening operation.

In a further embodiment of the method, the nozzle-needle guide body is introduced with an interference fit into the second nozzle-body part. This has the advantage that the nozzle-needle guide body owing to the interference fit lies in a fixed position relative to the second nozzle-body part. The interference fit between the second nozzle-body part and the nozzle-needle guide body moreover gives rise during the hardening operation to a diffusion welding process between the nozzle-needle guide body and the second nozzle-body part. This has the advantage that a permanent connection is easily produced between the nozzle-needle guide body and the second nozzle-body part.

In an embodiment of the method, the hardening temperature lies in a range of 1000 to 1100° C. This has the advantage that in this range the hardening operation and the solder connection are easy and cost-effective to produce.

In a further embodiment, brazing solder is fed in the form of brazing paste globules to the assembly region. This has the advantage that the quantity of brazing solder and the volume of the brazing globules may be precisely metered. The brazing paste globules may for example each have a volume of ca. 1 mm$^3$.

According to another embodiment, a nozzle body comprises a first nozzle-body part and a second nozzle-body part. In the first nozzle-body part a first nozzle-needle recess for receiving a nozzle needle and a first guide region for the nozzle needle are formed. Between the second nozzle-body part and the first nozzle-body part the assembly region is formed. In the assembly region a brazing solder connection is formed, the working temperature of which lies in the region of the hardening temperature of the first nozzle-body part.

This has the advantage that design requirements may be addressed by means of the at least two-part construction of the nozzle body and by a suitable choice of material. Nozzle-body parts that have to be eminently weldable may be formed by an eminently weldable high-grade steel. Nozzle-body parts that have to be eminently hardenable may be formed by an eminently hardenable high-grade steel. What is more, in a single operation at least the first nozzle-body part is hardened and a brazing solder connection produced. The degree of machining is moreover minimized, thereby reducing the material- and machining costs.

FIG. 1 shows an injection valve, in particular for internal combustion engines in motor vehicles. The injection valve has an injector housing 12, in which a high-pressure bore 13 is formed, as well as a port 14, which is coupled to the high-pressure bore 13 and through which fuel may be supplied to the injection valve. The injection valve further comprises a lifting device 21 with an actuator unit, which comprises an actuator 17 and a compensation element 20 that are coupled to one another in axial direction. The actuator 17 is designed for example as a piezo actuator. The lift of the lifting device 21 is dependent upon the axial extent of the actuator 17, which in turn is dependent upon an actuating signal. The lifting device 21 is coupled to a nozzle needle 15 and interacts in such a way with the nozzle needle 15 that the lift of the lifting device 21 is transmitted to the nozzle needle 15, and that the nozzle needle 15 is therefore moved into its closed position or an open position.

The injection valve further has a two-part nozzle body, which comprises a first nozzle-body part 1 and a second nozzle-body part 3. The nozzle body is mechanically coupled by a nozzle-clamping nut 18 to the injector housing 12. In the first nozzle-body part 1 a first nozzle-needle recess 10, a first guide region 8 and an injection nozzle 16 are formed. Formed in the second nozzle-body part 3 are a second nozzle-needle recess 4 and a second guide region 9, into which a nozzle-needle guide body 2 is introduced. The nozzle needle 15 is guided in the nozzle-needle guide body and the first guide region 8.

In a closed position the nozzle needle 15 closes the injection nozzle 16 and otherwise allows a flow of fuel through the injection nozzle 16.

Figure 2:
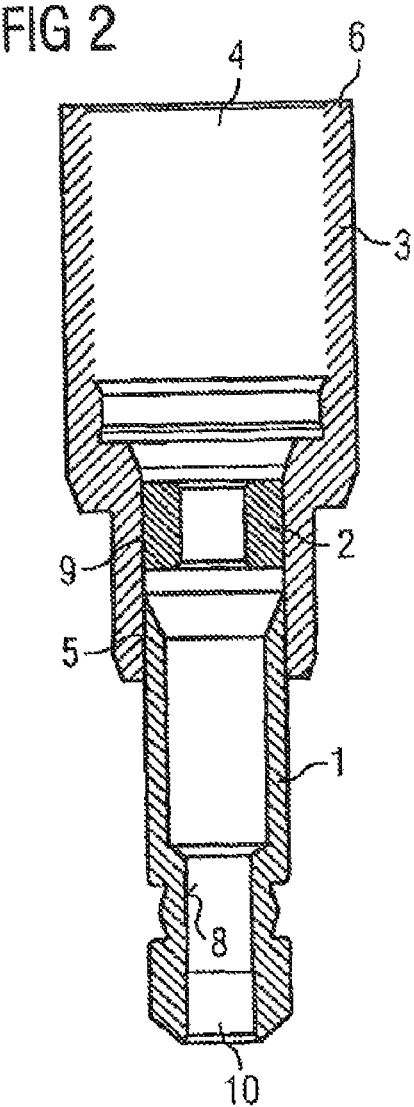

FIG. 2 shows the two-part nozzle body, which comprises the first nozzle-body part 1 and the second nozzle-body part 3. Formed in the first nozzle-needle part 1 is the first nozzle-needle recess 10 and in the second nozzle-body part 3 the second nozzle-needle recess 4. Between the first nozzle-body part 1 and the second nozzle-body part 3 an assembly region 5 is formed. Introduced into the second nozzle-body part 3 is a nozzle-needle guide body 2 that lies adjacent to a second guide region 9. The first nozzle-body part 1 has a first guide region 8. The second nozzle-body part 3 on the end remote from the assembly region 5 has a welding region 6. The welding region is used to attach the nozzle body in a fuel-proof manner to the injector.

Figure 3:
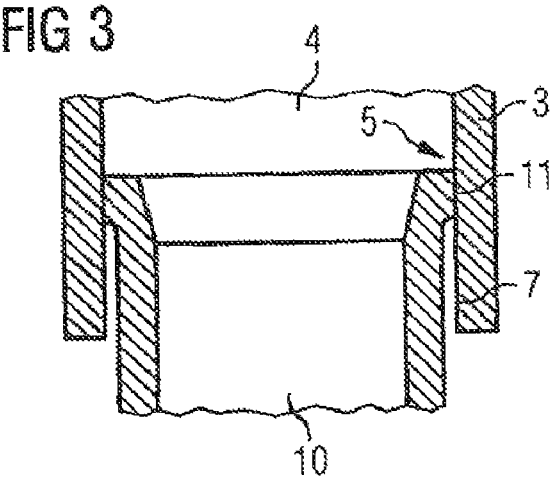

FIG. 3 shows a section through the assembly region 5. The assembly region 5 is formed between the first nozzle-body part 1 and the nozzle-body part 3. The assembly region is a region, in which the first nozzle-body part 1 and the second nozzle-body part 3 in the assembled state have directly opposing faces that need not necessarily be in mutual contact. The assembly region 5 has in one region an interference fit 11. The first nozzle-body part 1 is moreover designed such that between the first nozzle-body part 1 and the second nozzle-body part 3 in the assembly region 5 a gap 7 arises. The gap 7 may be formed in a structurally different manner. For example, the gap length and/or gap width may be selected differently. The gap assists the capillary action of the brazing solder and is therefore used to improve the brazing solder operation.

Figure 4:
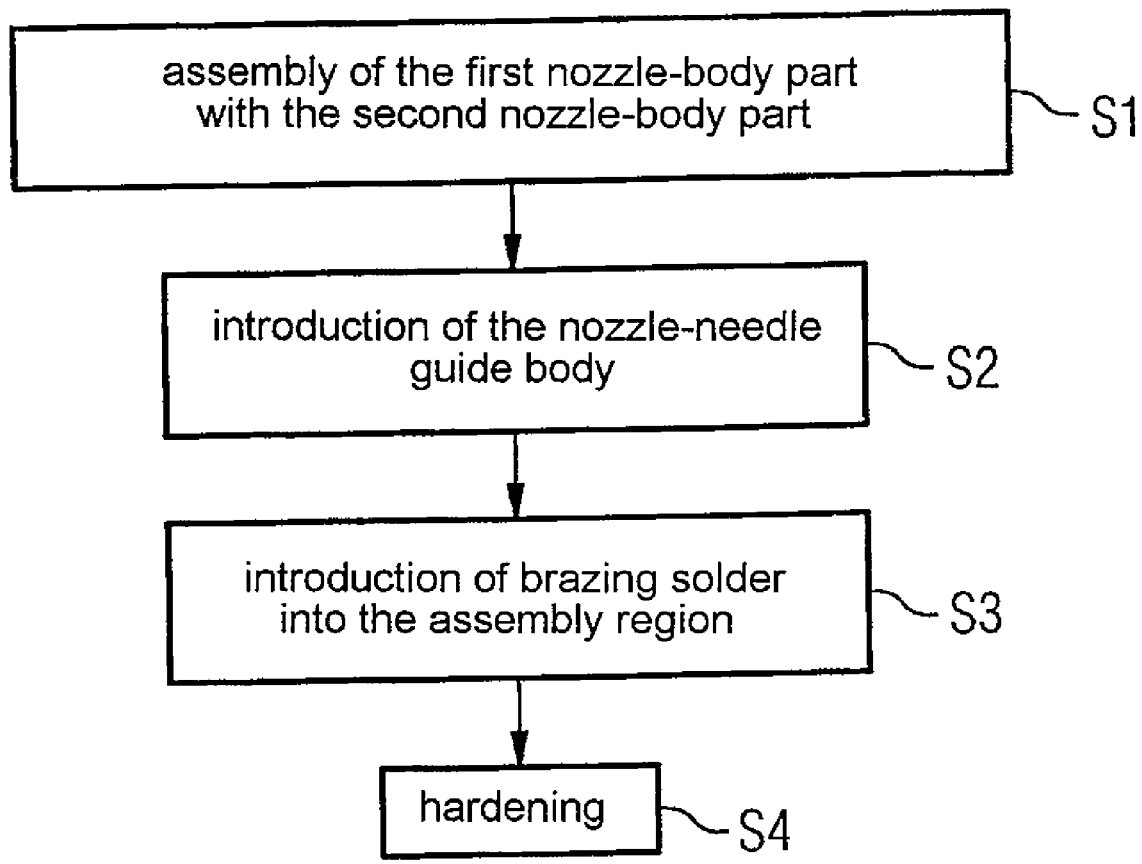

FIG. 4 shows a flow chart of the method of manufacturing a nozzle body. In a first step S1, the first nozzle-body part 1 is assembled with the second nozzle-body part 3. This may occur for example by inserting the first nozzle-body part 1 into the second nozzle-body part 3 or by clamping these parts together by means of an assembly device.

In a second step S2, the nozzle-needle guide body 2 is introduced into the assembled second nozzle-body part 3. This may be done by press-fitting the nozzle-needle guide body 2 into the second nozzle-body part 3 in order to achieve a defined position.

In a third method step, brazing solder is supplied to the assembly region 5. The brazing solder may be fed for example in the form of brazing paste globules. These brazing paste globules are fed uniformly at the circumference of the assembly region 5 in order to achieve as uniform a design of the brazing solder as possible. The brazing paste globules may moreover be introduced directly into the gap 7.

In a fourth method step, the hardening operation occurs. During this operation, for example a temperature of 1000 to 1100° C. is reached, at which the brazing solder melts and the first nozzle-body part 1 has its hardening temperature. By virtue of the suitable hardening process, at least the first nozzle-body part 1 is hardened.

What is claimed is:

1. A method of manufacturing a nozzle body, which comprises a first nozzle-body part and a second nozzle-body part, wherein the first nozzle-body part is formed from a hardenable material having a hardening temperature, and wherein in the first nozzle-body part a first nozzle-needle recess for receiving a nozzle needle and a first guide region for the nozzle needle are formed, the method comprising the steps of:

assembling the first nozzle-body part with the second nozzle-body part, wherein an assembly region is developed between the second nozzle-body part and the first nozzle-body part, the assembly region including an interference fit between respective first portions of the first and second nozzle-body parts and a gap between respective second portions of the first and second nozzle-body parts, the gap extending from the interference fit to an opening, the gap being sized to promote capillary action of a melted brazing solder into the gap, feeding brazing solder having a working temperature in the region of the hardening temperature of the first nozzle-body part to the assembly region, and subjecting the assembled first nozzle-body part and second nozzle-body part to a hardening operation, during which the hardening temperature of the first nozzle-body part is reached, wherein during the hardening operation the brazing solder melts and flows into the gap due to capillary action, such that the first and second nozzle-body parts are joined by a dual-type connection including (a) the interference fit between the respective first portions of the first and second nozzle-body parts and (b) the brazed connection across the gap between the respective second portions of the first and second nozzle-body parts.

2. The method according to claim 1, wherein the second nozzle-body part is manufactured from an eminently weldable high-grade steel and the first nozzle-body part is manufactured from an eminently hardenable high-grade steel.

3. The method according to claim 1, wherein a nozzle-needle guide body is introduced prior to the hardening operation into the second nozzle-body part.

4. The method according to claim 3, wherein the nozzle-needle guide body is introduced with an interference fit into the second nozzle-body part.

5. The method according to claim 1, wherein the hardening temperature lies in a range of 1000 to 1100° C.

6. The method according to claim 1, wherein the hardening is effected at a low oxygen partial pressure.

7. The method according to claim 1, wherein the brazing solder is fed in the form of brazing paste globules to the assembly region.

8. A nozzle body comprising:

a first nozzle-body part and a second nozzle-body part, wherein the first nozzle-body part is formed from a hardenable material having a hardening temperature, and wherein in the first nozzle-body part a first nozzle needle recess for receiving a nozzle needle and a first guide region for the nozzle needle are formed, an assembly region, which is formed between the second nozzle-body part and the first nozzle-body part, the assembly region including an interference fit between respective first portions of the first and second nozzle-body parts and a gap between respective second portions of the first and second nozzle-body parts, the gap extending from the interference fit to an opening, the gap being sized to promote capillary action of a melted brazing solder into the gap, and a brazing solder connection, which is formed in the assembly region and the working temperature of which lies in the region of the hardening temperature of the first nozzle-body part such that the brazing solder melts and flows into the gap due to capillary action, such that the first and second nozzle-body parts are joined by a dual-type connection including (a) the interference fit between the respective first portions of the first and second nozzle-body parts and (b) the brazed connection across the gap between the respective second portions of the first and second nozzle-body parts.

9. The nozzle body according to claim 8, wherein the second nozzle-body part is manufactured from an eminently weldable high-grade steel and the first nozzle-body part is manufactured from an eminently hardenable high-grade steel.

10. The nozzle body according to claim 8, further comprising a nozzle-needle guide body.

11. The nozzle body according to claim 10, wherein the nozzle-needle guide body is introduced with an interference fit into the second nozzle-body part.

12. The nozzle body according to claim 8, wherein the hardening temperature lies in a range of 1000 to 1100° C.

13. The nozzle body according to claim 8, wherein the hardening is effected at a low oxygen partial pressure.

14. The nozzle body according to claim 8, wherein the brazing solder is fed in the form of brazing paste globules to the assembly region.

* * * * *